US010459717B2

(12) United States Patent
Rummler et al.

(10) Patent No.: US 10,459,717 B2
(45) Date of Patent: Oct. 29, 2019

(54) OBSERVING EVOLUTION OF SOFTWARE DEVELOPMENT ARTIFACTS

(71) Applicants: Andreas Rummler, Dresden (DE); Tobias Nestler, Dresden (DE); Steffen Goebel, Dresden (DE)

(72) Inventors: Andreas Rummler, Dresden (DE); Tobias Nestler, Dresden (DE); Steffen Goebel, Dresden (DE)

(73) Assignee: SAP SE, Walldorf (DE)

( * ) Notice: Subject to any disclaimer, the term of this patent is extended or adjusted under 35 U.S.C. 154(b) by 616 days.

(21) Appl. No.: 13/961,374

(22) Filed: Aug. 7, 2013

(65) Prior Publication Data

US 2015/0046904 A1 Feb. 12, 2015

(51) Int. Cl.
*G06F 9/44* (2018.01)
*G06F 8/71* (2018.01)

(52) U.S. Cl.
CPC ..................................... *G06F 8/71* (2013.01)

(58) Field of Classification Search
CPC ................................... G06F 21/57; G06F 8/71
See application file for complete search history.

(56) References Cited

U.S. PATENT DOCUMENTS

| | | | |
|---|---|---|---|
| 8,020,152 B2 * | 9/2011 | Wadsworth | G06F 11/3672 717/126 |
| 8,024,700 B2 | 9/2011 | Cantor et al. | |
| 8,146,100 B2 | 3/2012 | Kilian-Kehr | |
| 8,352,445 B2 | 1/2013 | Begel et al. | |
| 8,375,351 B2 | 2/2013 | Ahadian et al. | |
| 8,397,210 B2 | 3/2013 | Dutta et al. | |
| 8,438,532 B2 | 5/2013 | Fox et al. | |
| 8,438,541 B2 | 5/2013 | Abrams et al. | |
| 8,464,209 B2 | 6/2013 | Marius | |
| 9,430,520 B2 * | 8/2016 | Dove | G06F 16/24 |
| 2008/0244522 A1 * | 10/2008 | Bernin | 717/122 |
| 2010/0318959 A1 * | 12/2010 | Rowan et al. | 717/105 |
| 2011/0035323 A1 * | 2/2011 | Hamilton et al. | 705/301 |
| 2012/0072884 A1 | 3/2012 | Balko et al. | |
| 2012/0124547 A1 | 5/2012 | Halbedel | |
| 2012/0131561 A1 | 5/2012 | Spiess et al. | |
| 2012/0143867 A1 | 6/2012 | Roy et al. | |
| 2012/0159438 A1 | 6/2012 | Plate | |
| 2012/0317539 A1 | 12/2012 | Dang et al. | |
| 2013/0036400 A1 * | 2/2013 | Bak | G06F 8/71 717/101 |
| 2013/0074038 A1 * | 3/2013 | Fox | G06F 8/70 717/122 |
| 2013/0091491 A1 | 4/2013 | Koutyrine et al. | |

(Continued)

*Primary Examiner* — Huawen A Peng
(74) *Attorney, Agent, or Firm* — Fish & Richardson P.C.

(57) ABSTRACT

Methods, systems, and computer-readable storage media for providing notifications in distributed development. In some implementations, actions include receiving change information, the change information indicating one or more changes to source code, processing the change information to determine one or more entities associated with the change, comparing the one or more entities to one or more subscriptions, the one or more subscriptions being specific to a user, for each entity associated with a subscription, providing a notification in a set of notifications, and providing a sub-set of notifications for display to the user.

15 Claims, 6 Drawing Sheets

(56) References Cited

U.S. PATENT DOCUMENTS

2014/0237387 A1* 8/2014 Ryall .................... H04L 65/403
715/753
2014/0258968 A1* 9/2014 Brown .................... G06F 17/21
717/103

* cited by examiner

Developer Workbench

Source Outline — 202 project1
- sources
  - Class1
  - Class2
  - Class3
- resources
- tests

Dependencies — 204 dependent-library1
- sources
  - Class A
  - Class B
  - Class C
dependent-library2
dependent-library3
dependent-library4
dependent-library5

Source Code Editor: Class 1 — 220

```
public class CreateWebSource
{
    public static void main(String[] args) throws Exception
    {
        System.out.println("" );

try
        {
            if ( args == null || args.length != 4 )
            {
                System.out.println(
                    "Usage: CreateWebSource <webServiceURL> <userName> <password>" );
            }
            else
            {
                // Get web service URL from command-line arguments
                String webServiceURL = args[0];
                System.out.println( "Using web service URL \"" + webServiceURL + "\"" );

// Get username and password
                String username = args[1];
                String password = args[2];

// Get previous web service client
                AdminPortType adminPort =
                    getPreviousWebServiceClient( webServiceURL );
```

— 230

The Class AdminPortType will be replaced by AdministrativeElement within two weeks. The recommended fix issued by user Hans is the following ... [show details]

Alternatively, the following fix(es) have been proposed in your network: - solution at developers-forum.com [show details]

OBSERVING EVOLUTION OF SOFTWARE DEVELOPMENT ARTIFACTS

BACKGROUND

Software can be developed in distributed environments. For example, multiple developers can develop source code. The developers can be dispersed throughout a location, a region, or world-wide. Distributed development of software products includes a range of challenges. An example challenge is following the mutual development progress of individual developers that are members of a development team.

Version Control Systems (VCSs) are implemented to support distributed development of software. Such systems, however, focus on text changes. For example, a VCS can manage changes based on text files, but the textual information is independent of the semantics of the programming language of the source code. Consequently, although the textual information alerts developers to changes, the developers have to further investigate to be made fully aware of the changes.

SUMMARY

Implementations of the present disclosure include computer-implemented methods for providing notifications in distributed development processes. In some implementations, actions include receiving change information, the change information indicating one or more changes to source code, processing the change information to determine one or more entities associated with the change, comparing the one or more entities to one or more subscriptions, the one or more subscriptions being specific to a user, for each entity associated with a subscription, providing a notification in a set of notifications, and providing a sub-set of notifications for display to the user.

In some implementations, each entity of the one or more entities includes one of a developer, a source code file, and a source code artifact.

In some implementations, processing the change information includes, for each source code change indicated in the change information, providing concept-level semantics describing the source code change.

In some implementations, the concept-level semantics are specific to a programming language of the source code.

In some implementations, providing a sub-set of notifications for display to the user includes providing an activity feed for display to the user, the activity feed including notifications of the sub-set of notifications.

In some implementations, actions further include providing a set of subscriptions for display to the user, the set of subscriptions including entities, to which the user is subscribed.

In some implementations, providing a sub-set of notifications for display to the user includes providing source code for display to the user, and providing a notification of the sub-set of notifications as an overlay to the source code, the notification being associated with at least a portion of the source code.

In some implementations, actions further include receiving input from the user, the input indicating a user request to subscribe to an entity, and in response, subscribing the user to the entity.

In some implementations, subscribing the user to the entity includes storing subscription information in a subscription repository, the subscription information indicating that the user is subscribed to the entity.

In some implementations, the sub-set of notifications includes all notifications that are included in the set of notifications.

In some implementations, the sub-set of notifications includes less than all notifications that are included in the set of notifications.

In some implementations, actions further include filtering notifications from the set of notifications to provide the sub-set of notifications.

In some implementations, filtering is performed based on one or more filters defined by the user.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to a notification system that is provides a link between software development environments and changes in software artifacts, e.g., source code. More particularly, implementations of the present disclosure enable developers to subscribe to entities, e.g., developers, source code files and/or code artifacts. Further, notifications can be published to subscribing developers. In some examples, notifications inform developers on activities that have occurred with respect to entities. Implementations of the present disclosure ensure transparency, create awareness of the actual development status, ease resolution of errors and exceptions, and unveil connections between written code and the responsible developer.

Figure 1:
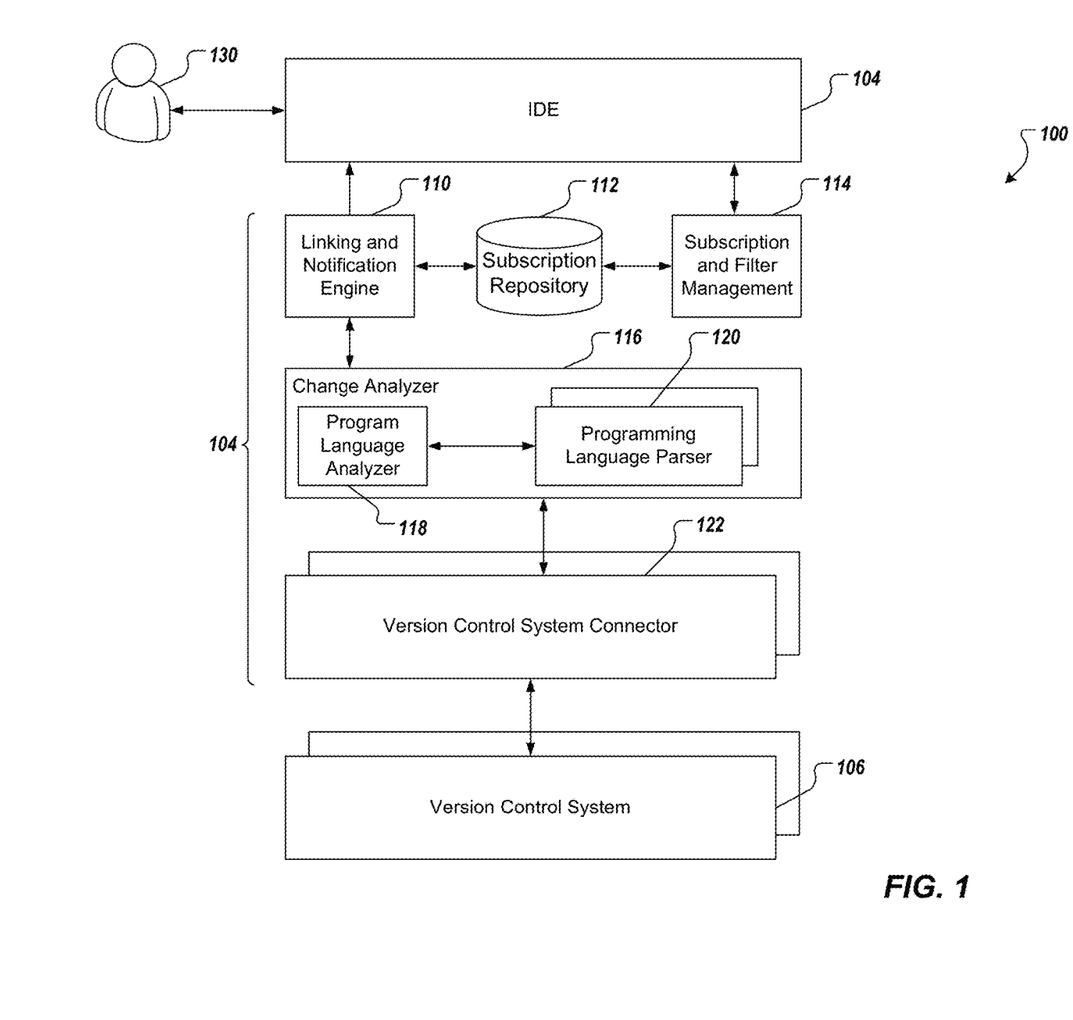
FIG. 1 depicts an example high-level architecture in accordance with implementations of the present disclosure.

FIG. 1 depicts an example architecture 100 in accordance with implementations of the present disclosure. The example architecture 100 includes an integrated development environment (IDE) 102, a notification system 104, and one or more version control systems (VCSs) 106. As discussed in further detail herein, the notification system 104 monitors and analyzes source code changes captured in the VCSs 106, and provides notifications to a developer using the IDE 102. In some examples, each of the components of the example architecture 100 is provided as one or more computer-executable programs that are executed by one or more computing devices. In some examples, the example architecture 100 can be realized in a client-server environment, in which components are implemented on a client-side and components are implemented on a server-side. In some examples, the client-side and the server-side communicate through a network. For example, the IDE 102 can be provided on a client-side, and the notification system 104 and the VCSs 106 can be provided on a server-side, or respective server-sides.

In some examples, the IDE 102 provides comprehensive facilities to developers for software development. Example IDEs can include a source code editor, build automation tools, a debugger, a compiler and/or an interpreter. An example IDE includes Eclipse provided by the Eclipse Foundation. In some examples, each VCS 106 can track changes in a software project during a development process. In some examples, the VCS 106 can include revision control to track and manage changes to software components in a distributed development process. Example VCSs can include Apache Subversion provided by the Apache Software Foundation, and Perforce provided by Perforce Software, Inc.

In accordance with implementations of the present disclosure, the IDE 102 can include side-panels, plug-ins, and/or entries in context menus that enrich the IDE 102 with subscription and notification functionality, e.g., in an integrated manner. In this manner, developers are able to decide what information should be propagated in which way, e.g., using filters and search tools, in order to stay focused on their actual implementation tasks. Developers are also able to reach out to peers and/or consume content of community pages without leaving the IDE 102, e.g., using integrated browser views.

In some implementations, the notification system 104 includes a linking and notification engine 110, a subscription repository 112, a subscription and filter management module 114, and a change analyzer 116. In the depicted example, the change analyzer 116 includes a program language analyzer 118 and one or more programming language parsers 120. In some examples, each programming language parser 120 corresponds to a respective programming language, e.g., Java, C++. In some examples, the notification system 104 can include one or more VCS connectors 122. In some examples, each VCS connector 122 corresponds to a respective VCS 106.

In general, source code files are stored in and managed by the VCS 106, e.g., in a code base. In some examples, during the development process, a developer can access source code files through the IDE 102 and the VCS 106. For example, the developer can check-out a source code file from the VCS 106, can manipulate, e.g., edit, a local copy of the source code file using the IDE 106 to provide a modified file, and can check-in the modified file to the VCS 106. The VCS 106 can process the modified file to determine changes that had been made, and update the code base accordingly. In some examples, the VCS 106 provides a change file, e.g., text file, that describes the changes.

In accordance with implementations of the present disclosure, traditional VCSs, e.g., VCSs 106, are supplemented with a notification layer, e.g., the notification system 104, that is linked to developer activities, e.g., the IDE 102, and notifies developers of development activities. As discussed in further detail herein, implementations of the present disclosure enable distributed developers to better understand work of other developers, and to monitor the development progress.

In some implementations, each developer is able to subscribe to entities associated with a development process. In some examples, entities can include one or more developers, one or more source code files, and one or more code artifacts. In some examples, a code artifact can be specific to a programming language. Example code artifacts of Java, for example, can include a class or a method.

In accordance with implementations of the present disclosure, the developer can receive notifications about activities of and/or changes to entities. For example, the developer can receive notifications in response to activities performed by developers, to which the developer is subscribed. As another example, the developer can receive notifications in response to changes made to source code files, to which the developer is subscribed. As another example, the developer can receive notifications in response to changes made to code artifacts, e.g., classes, methods in the example case of Java, to which the developer is subscribed.

In further detail, and with reference to FIG. 1, a developer 130 can interact with the subscription and filter management component 114 through the IDE 102. In some examples, the developer 130 can provide user input that indicates one or more entities, to which the developer 130 subscribes. In some examples, the developer 130 can provide user input that indicates one or more entities, from which the developer unsubscribes. In some examples, the IDE 102 can provide a list of entities associated with respective software development projects, and can provide entity information to the developer 130, e.g., through a display of a computing device. In some examples, the developer 130 provides user input to the IDE 102 indicating subscription/un-subscription to a particular entity. In some examples, the IDE 102 can provide the user input and respective entity information to the subscription and filter management component 114.

In some examples, the subscription and filter management component 114 subscribes/un-subscribes the developer 130 to/from the respective entity. In the example case of a subscription, the subscription and filter management component 114 stores a subscription in the subscription repository 112, the subscription indicating that the developer 130 is subscribed to a particular entity. In the example case of an un-subscription, the subscription and filter management component 114 removes a subscription from the subscription repository 112.

In some implementations, the linking and notification engine 110 provides a link between the developer 130 and entities, e.g., other developers, source code files, code artifacts. In this manner, traceability of development changes is provided. In some implementations, the linking and notification engine 110 reports changes to files and/or code artifacts at the level of known programming language concepts. Using Java as an example, example programming language concepts can include classes, methods, e.g., artifacts discussed above, and member variables.

In some implementations, the linking and notification engine 110 provides notifications to the IDE 102 for presentation to the developer 130, e.g., in an activity feed displayed on a display. An activity feed can include one or more notifications. In some examples, the notifications are aggregations of respective single commits to a VCS 106. More specifically, a notification can be provided as a high-level activity description, e.g., several committed changes of a single class that contribute to a single feature. In some examples, this abstraction helps developers to more easily identify the changes that are relevant to their own development activities. In some examples, a notification can report comments and/or status updates developers add to the artifacts being worked on, e.g., "Will update method X next week."

In general, the developer 130 consumes the notifications within the IDE 106. In some examples, and as discussed in further detail herein, a summarizing home screen can be provided. In some examples, screens that are dedicated to specific entities can be provided. In some implementations, the developer 130 is able to define one or more fine-grained filters that reflect information that the developer 130 wants to subscribe to, and/or in what frequency the developer 130 would like to be informed about activities/changes. In some examples, the developer 130 can provide user input to the IDE 102 to define the filters. In some examples, the subscription and filter management component 114 includes filter information with the subscriptions stored in the subscription repository.

In some implementations, the developer 130 can provide feedback through the IDE 102. In some examples, the developer 130 can provide feedback to the developer(s) responsible for a code change or activity update. For example, a user interface can be provided that enables the developer 130 to input feedback, e.g., textual comments, "like" or "dislike" indications, which feedback can be provided to relevant developers.

In some implementations, the notification system 104 can enrich an activity feed with additional information and/or overlay additional information to displayed artifacts. In some examples, additional information can be provided from internal and/or external information sources. Example internal information sources can include forums and/or discussion groups that are internal to an enterprise. In some examples, external information sources can include information sources that are not directly affiliated with an enterprise, e.g., company, institution, that is performing/supporting the development. Example external information sources can include computer-implemented social networking services, such as online forums and/or discussion groups, Twitter, Facebook, Google+, and the like. In some examples, additional information sources can frequently be used by developers to discuss occurring problems or understand appearing error messages and exceptions, for example Linking this additional information with a specific change set can assist other developers, e.g., the developer 130, in understanding the background and context of the change.

In some examples, it can be determined that additional information is relevant to a particular entity. Consequently, a notification can be provided, e.g., that includes the additional information and/or a link to the additional information, and can be associated with the particular entity. For developers that are subscribed to the entity, the notification can be displayed with the entity. For developers that are not subscribed to the entity, the notification is not displayed with the entity. For example, it can be determined that additional information is relevant to a particular entity, and a corresponding notification can be provided. A first developer that is subscribed to the entity can open up the entity for display, e.g., using an IDE. The displayed entity can include the additional information. A second developer that is not subscribed to the entity can open up the entity for display. The displayed entity does not include the additional information.

In general, by providing a link between the developer 130 and additional information sources, the developer 130 can access additional information regarding entities, to which they are subscribed, and/or can publish information to external information sources. As one example, a solution to a specific programming problem can be posted in an online community. The notification system 104 can access information regarding the solution and problem, and can provide a notification to the developer 130 to enable the developer 130 to better handle a problem that they are dealing with. As another example, the developer 130 can retrieve a social networking profile associated with a developer, to which the developer 130 is subscribed, from a social networking service, e.g., Twitter, Facebook, Google+. In this manner, the developer 130 can be provided with a better understanding of the background and/or experience of the other developer.

To this end, the linking and notification engine 110 also provides a link between the developer 130 and information sources, e.g., computer-implemented social networking services, publicly available websites, and the like. In some examples, one or more connectors (not shown) can be provided that enable communication with respective information sources, e.g., social networking services. In some examples, the connectors enable the notification system 104 to interact with application programming interfaces (APIs) of respective information sources.

In accordance with implementations of the present disclosure, respective VCSs 106 communicate with the change analyzer 116. In some examples, respective VCS connectors 122 are provided to enable such communication. For example, the VCS connector 122 can format data provided from and/or provided to the VCS 106 to an appropriate format for consumption, e.g., by the change analyzer 116, or the VCS 106. In some examples, the change analyzer 116 directly communicates with each VCS 106, e.g., VCS connectors are absent.

In some implementations, the change analyzer 116 processes data provided from the VCSs 106. In some examples, changes committed in the VCS 106 are analyzed to understand the impact of the changes on the concept level of the programming language. The program language analyzer 118 references a language-specific programming language parser 120 to analyze changes. In some examples, the program language analyzer 118 is agnostic to the programming language of an entity, e.g., source code file, code artifact. In some examples, the program language analyzer 118 processes the entity to classify the programming languages in one or more classes. Example classes can include statically/dynamically typed, object-oriented (OO), and functional. By classifying the programming language, a generic programming language model, e.g., class, method, interface, member variables, can be provided. In this manner, other components of the notification system 104 are shielded from programming language specific details. That is, components of the notification system 104 need not be aware of details specific to each possible programming language. In some examples, the programming language parsers 120 each parse a respective programming language, and provide programming language independent results to the program language analyzer 118. In some examples, the programming language parser 122 uses and extends available open source frameworks. In some examples, the result provided form the programming language parser 122 can be used to monitor ongoing development activities, create status updates, e.g., automatically, semi-automatically, and follow code artifacts.

To illustrate implementations of the present disclosure, an example progression resulting in a notification will be described. A first developer, e.g., the developer 130 of FIG. 1, is subscribed to an entity that is part of a distributed development process. A second developer access and edits the entity, e.g., through an IDE that is in communication with a VCS, e.g., the VCS 106 of FIG. 1, to provide a modified artifact. For example, the second developer can check-out source code from the VCS, can edit a local copy of the source code, and can check-in the source code back to the VCS. In this example, the change can include the addition of a method X to a class Y in source code at a particular line number Z. In response to check-in of the source code, the VCS can provide a file that describes changes to the source code. In some examples, the file includes a text file that provides a change set. The file can indicate, for example, that a change was made at the particular line number.

The file is provided to a notification system, e.g., the notification system 104 of FIG. 1. For example, a change analyzer, e.g., the change analyzer 116 of FIG. 1, receives the file. In some examples, the change analyzer accesses the source code. The change analyzer processes the file and/or the source code (modified) to identify changes in terms of the particular programming language. In this example, the change analyzer parses the class to determine that the method was added to the class at the particular line. The change analyzer can provide change information at the concept-level of the particular programming language. That is, the change analyzer provides semantics to the change that are specific to the particular programming language. In this example, the change information can provide that "Method X was added to class Y at line Z." In some examples, the change information can identify the second developer, i.e., the developer that made the change. In some examples, the change information can include a time/date, at which the change was made (or committed) to the source code.

Continuing with this example, the change information can be provided to a linking and notification engine, e.g., the linking and notification engine 110 of FIG. 1. The linking and notification engine can reference a subscription repository, e.g., the subscription repository 112 of FIG. 1, to determine subscriptions relevant to the change information. For example, the method, class and/or developer (second developer) involved in the example change can be cross-referenced with subscriptions provided in the subscription repository, e.g., to determine whether any developers are subscribed to Method X, Class Y, and/or the second developer. In this example, it is determined that the first developer is subscribed to the source code that includes Class Y. In response, a notification can be generated to inform the first developer that, for example, "Second Developer added Method X to class Y at line Z." The first developer can log into an IDE, e.g., the IDE 104 of FIG. 1. In response to the log-in, pending notifications for the first developer can be retrieved, and can be displayed, e.g., in a developer dashboard, as discussed in further detail below.

Figure 2A:
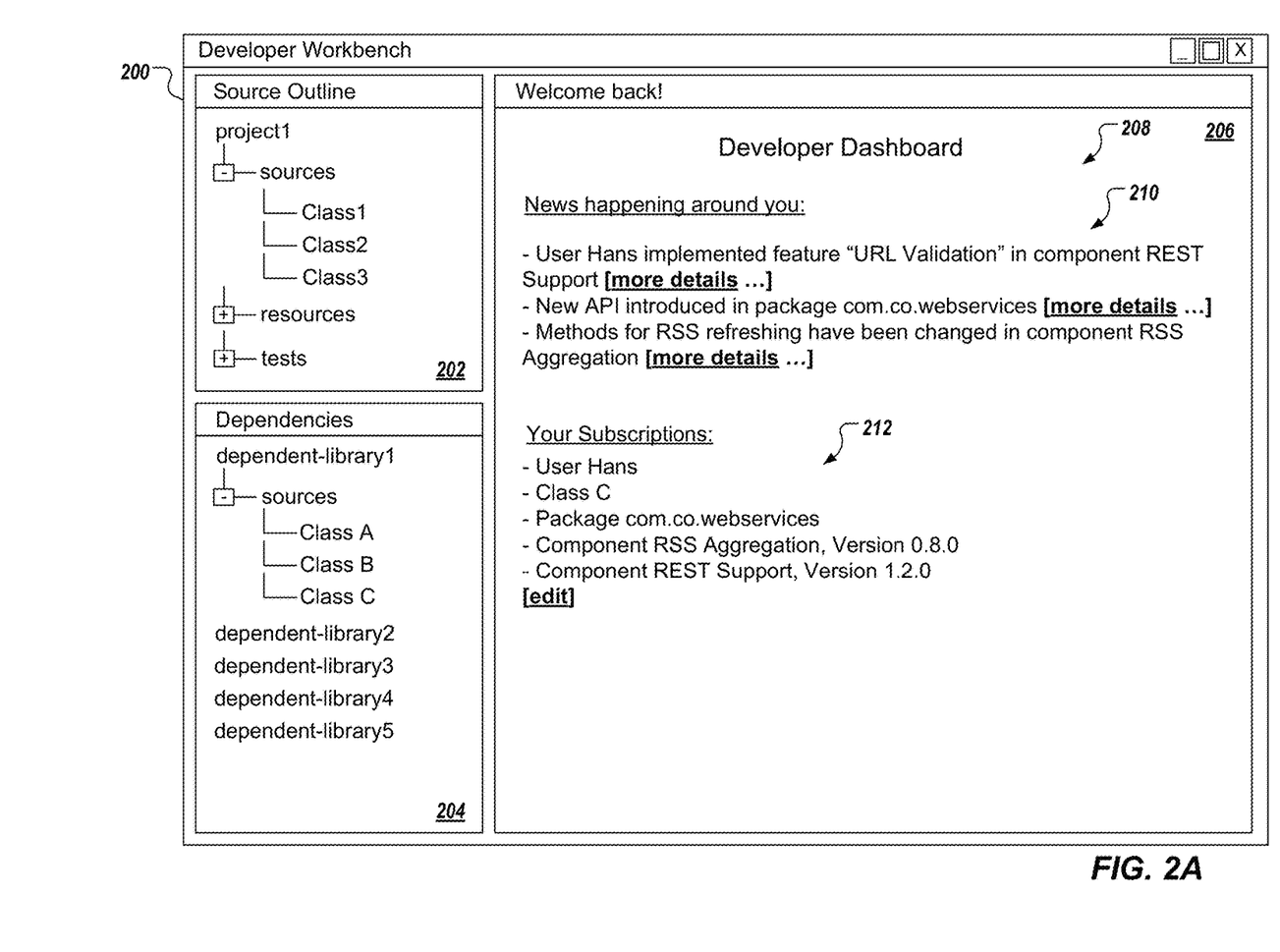
FIGS. 2A-2C depict respective screen-shots in accordance with implementations of the present disclosure.
Figure 2B:
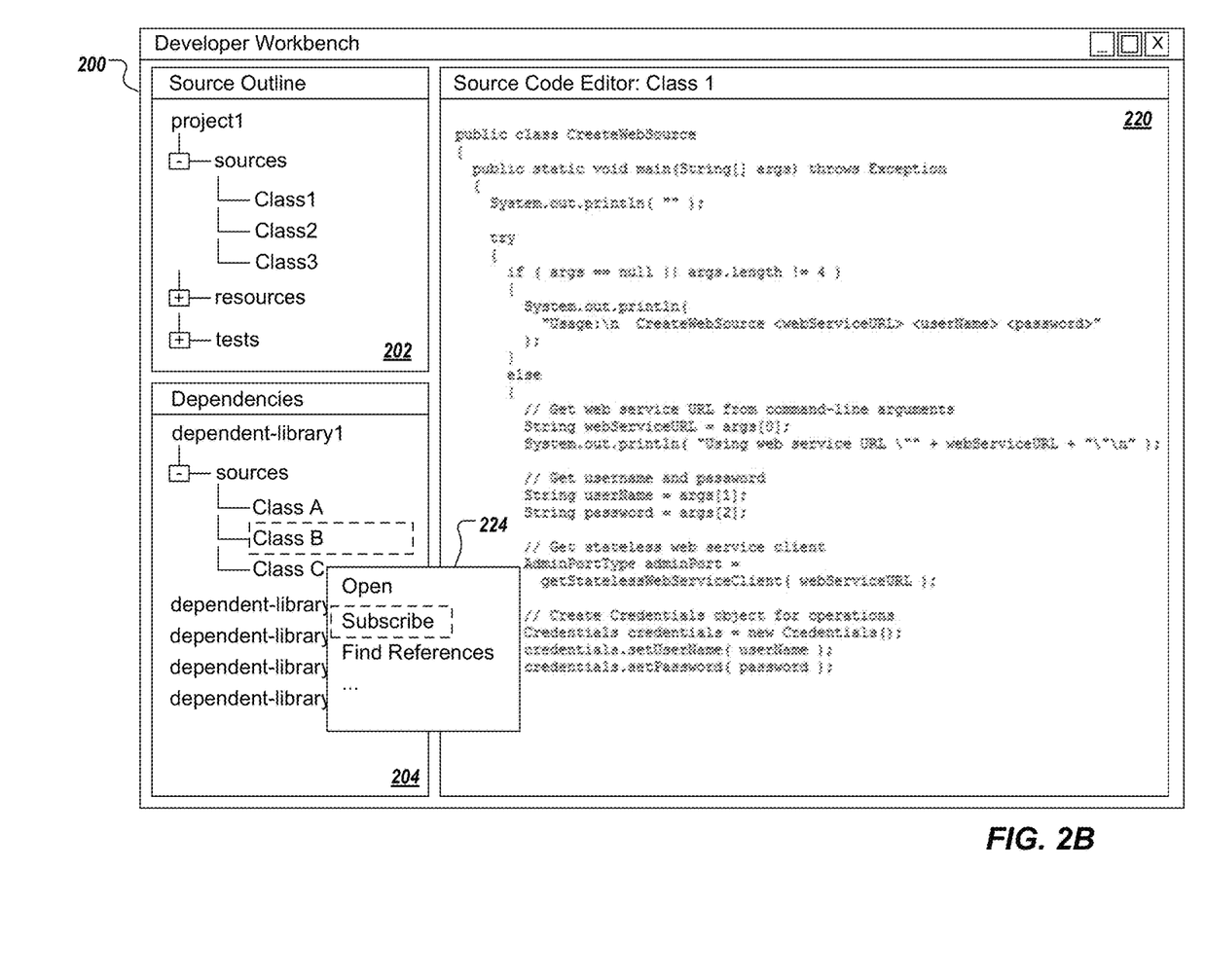
Figure 2C:
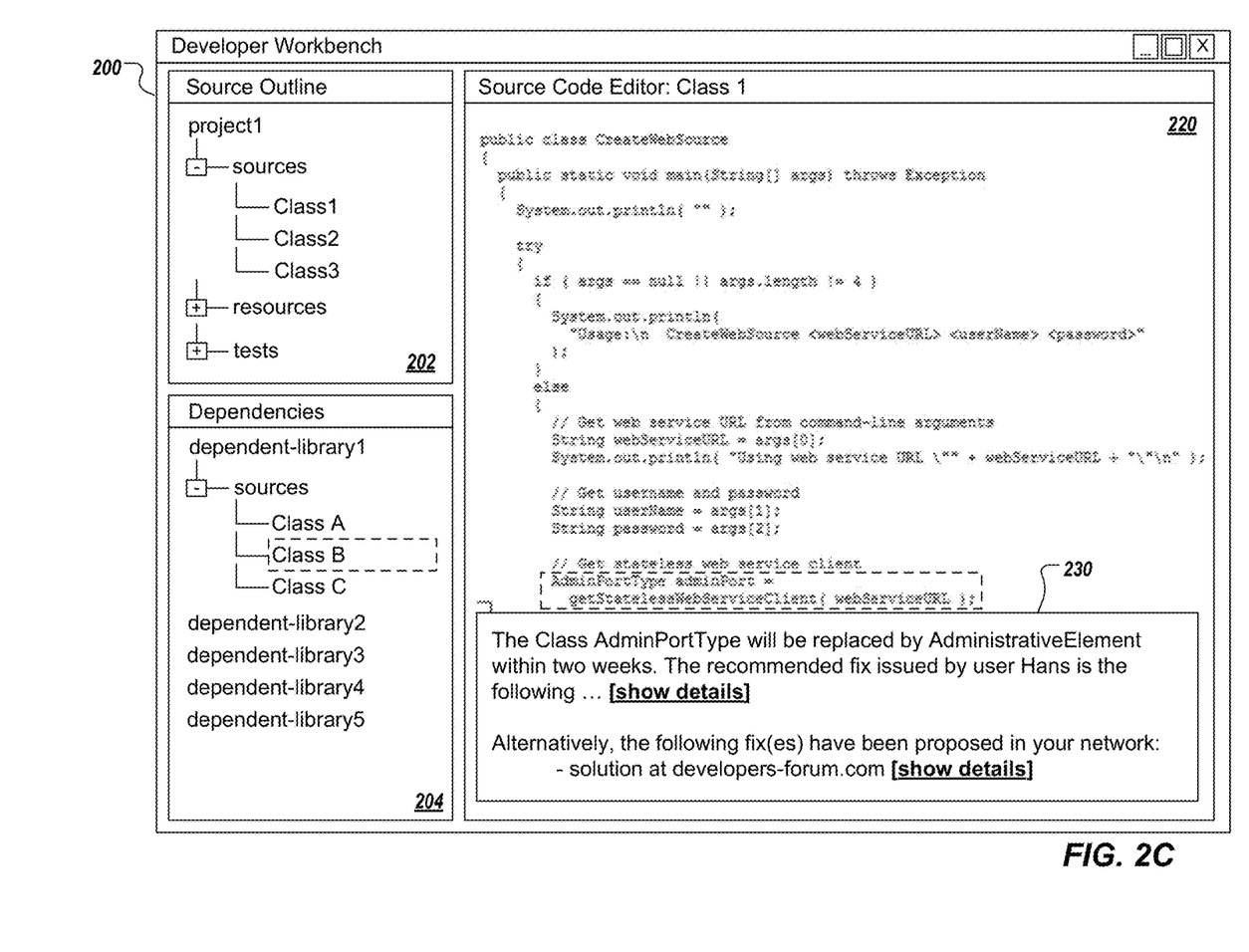

FIGS. 2A-2C depict respective screen-shots in accordance with implementations of the present disclosure. FIG. 2A depicts a screen-shot of an example workbench 200 that can be displayed, e.g., by the IDE 102. In the depicted example, the workbench 200 includes a source outline frame 202, a dependencies frame 204, and a dashboard frame 206. In some examples, the source outline frame 202 displays a file tree of distributed development projects. In some examples, the dependencies frame 204 displays dependencies between entities, e.g., code artifacts, source code, libraries. In accordance with implementations of the present disclosure, the dashboard frame 206 provides a developer dashboard 208 that is specific to a particular developer, e.g., the developer that is logged into the IDE.

In the depicted example, the developer dashboard 208 includes notifications 210 and subscription information 212. In some examples, the notifications 210 express activities that have occurred and/or changes made to entities. In some examples, the notifications 210 are based on entities, e.g., developers, code artifacts, source code files, that the developer is subscribed to. For example, the developer can be subscribed to a developer "Hans." Consequently, a notification corresponding to an activity performed by "Hans" is provided in the notifications 210, and the user "Hans" is listed in the subscription information 212. As another example, the developer can be subscribed to a code artifact "package com.co.webservices." Consequently, a notification corresponding to a change to "package com.co.webservices" is provided in the notifications 210, and the code artifact "package com.co.webservices" is listed in the subscription information 212. Accordingly, the notifications 210 can be provided as an activity feed that includes notifications associated with entities that the developer is subscribed to.

FIG. 2B depicts a screen-shot of the example workbench 200 in an editing mode. In the depicted example, the workbench 200 includes the source outline frame 202, the dependencies frame 204, and an editor frame 220. For example, the developer can select a code artifact to edit, e.g., from the source frame 202, and source code of the artifact can be displayed for editing within the editor frame 220. In the depicted example, the developer has selected "Class 1" for editing. In some examples, the code artifact can include dependent classes, e.g., sub-classes. In the depicted example, dependent classes of "Class 1" can include "Class A," "Class B" and "Class C."

As noted above, the developer can subscribe to one or more entities. FIG. 2B depicts developer subscription to a dependent class. More specifically, in the depicted example, the developer has selected "Class B," e.g., by right-clicking on "Class B" in the dependencies frame 204. In response to developer selection, a menu 224 is displayed. In the depicted example, the menu 224 includes option for "Open," e.g., to open the class for editing, "Subscribe," e.g., to subscribe to the selected class, and "Find References," e.g., to find references to the selected class in other classes. In the depicted example, the option "Subscribe" is selected. In response, the developer is subscribed to the selected class. In the depicted example, the selected class is "Class B," which is named "AdminPortType."

FIG. 2C depicts the dashboard 200 including a notification 230. In some examples, the notification 230 can be displayed in response to the developer subscribing to an entity. In the depicted example, and as discussed above with reference to FIG. 2B, the developer subscribed to the class "AdminPortType." Consequently, the notification 230, which is specific to the class "AdminPortType" is displayed.

Figure 3:
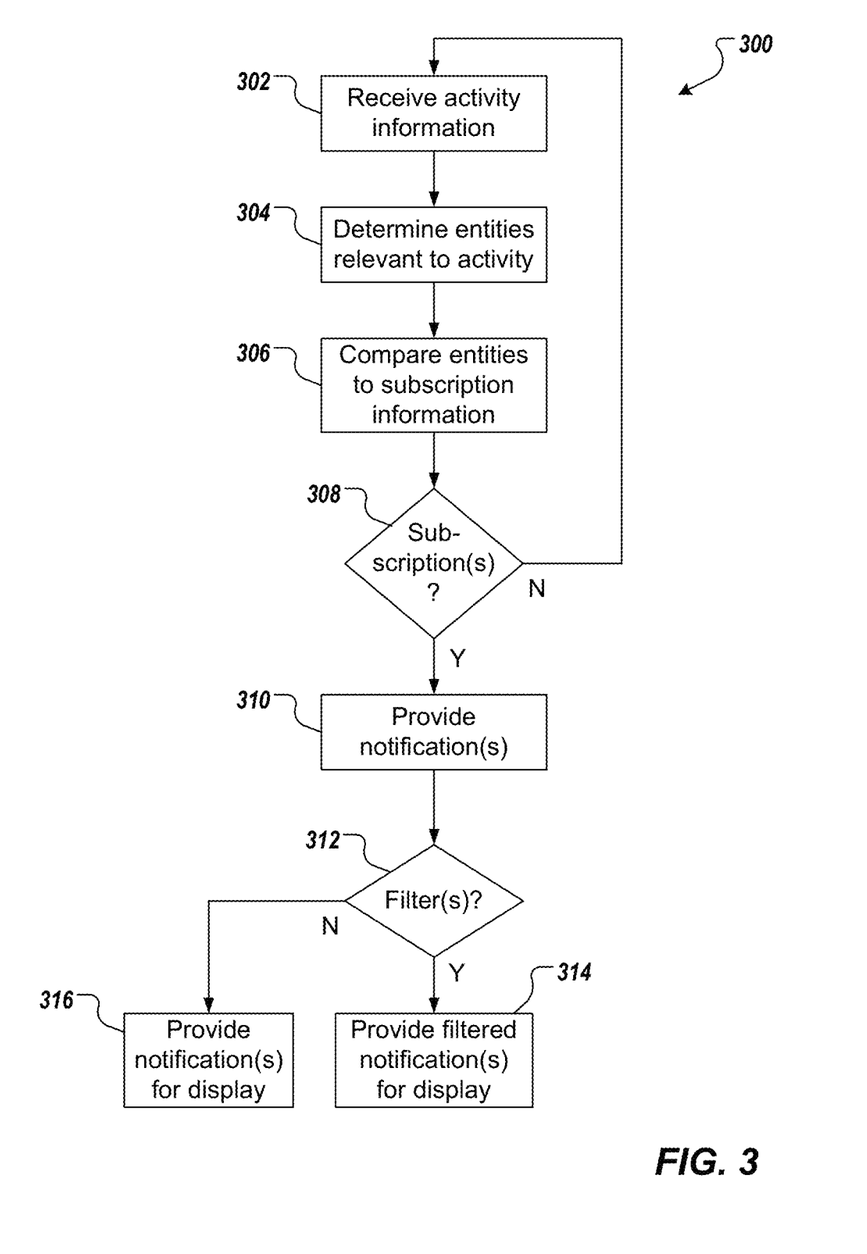
FIG. 3 depicts an example process that can be executed in accordance with implementations of the present disclosure.

FIG. 3 depicts an example process 300 that can be executed in accordance with implementations of the present disclosure. In some examples, the example process 300 can be provided as one or more computer-executable programs executed using one or more computing devices. For example, the example architecture 100 of FIG. 1 can execute the process to provide notifications in distributed development.

Activity information is received (302). For example, a notification system, e.g., the notification system 104 of FIG. 1, can receive activity information from a VCS, e.g., the VCS 106 of FIG. 1. In some examples, the activity information can be provided in a change file. One or more entities relevant to an activity that is the subject of the activity information can be determined (304). For example, the notification system 104 can process the activity information and/or an entity, e.g., a source code file, to determine the one or more entities. As one example, an activity can include a code artifact edited by a developer. Consequently, one or more entities can include the source code file that contains the code artifact, the code artifact, and/or the developer.

The one or more entities are compared to subscription information (306). For example, the one or more entities can be cross-referenced with subscription information stored within a subscription repository, e.g., the subscription repository of FIG. 1. In some examples, the subscription information is specific to a developer, e.g., the developer 130 of FIG. 1. It is determined whether one or more subscriptions are relevant to the one or more entities (308). If no subscriptions are determined to be relevant, the example process 300 loops back. If one or more subscriptions are determined to be relevant, respective notifications are provided (310).

It can be determined whether one or more filters are to be applied (312). For example, the developer can define one or more filters to filter notifications from being displayed, e.g., in an activity feed. An example filter can include a time-based filter, e.g., filter any notifications associated with activities that are greater than Z days old. Another example filter can be a developer-based filter, e.g., filter any notifications associated with developer Q. Another example filter can be an artifact-based filter, e.g., filter any notifications associated with code artifact R. If it is determined that one or more filters are to be applied, filtered notifications are provided for display (314). If it is determined that one or more filters are not to be applied, un-filtered notifications are provided for display (316).

Figure 4:
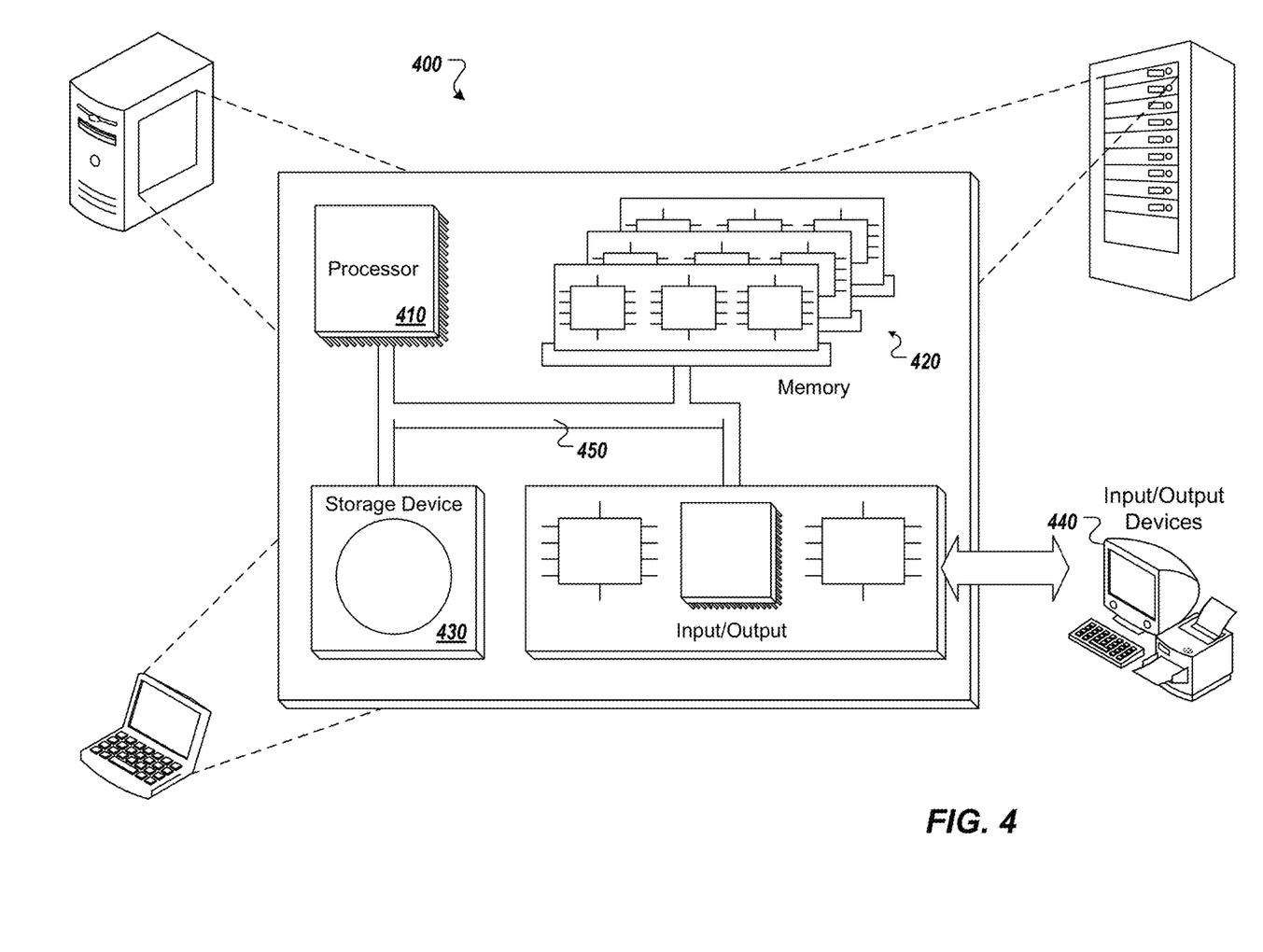
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 800. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing notifications in distributed development processes, the method being executed using one or more processors and comprising:
    receiving, by the one or more processors of a server-side computing system, a modified file comprising a plurality of changes to a source code, the changes being entered within a software development environment that is provided by a client-side computing system associated with one of a plurality of entities;
    processing, by the one or more processors, the modified file to identify the plurality of changes to the source code;
    automatically generating, by the one or more processors, a change information, the change information indicating the plurality of changes to the source code;
    processing, by the one or more processors, the change information to determine one or more entities associated with the plurality of changes, wherein each entity of the one or more entities comprises one of a developer, a source code file, and a source code artifact;
    comparing, by the one or more processors, the one or more entities to one or more subscriptions, the one or more subscriptions being specific to a user;
    for each entity associated with a subscription, providing to a corresponding client-side computing system a notification in a set of notifications, the notification comprising an aggregation of two or more committed changes of the plurality of changes that contribute to a single feature of the source code based on a frequency the user wants to be informed of the plurality of changes; and
    providing a sub-set of notifications for display to the user within the software development environment of the corresponding client-side computing system, the sub-set of notifications comprising an additional information associated to the one or more entities that describes a background and a context of each of the two or more committed changes, the additional information being provided from at least one of internal information sources and external information sources, the external information sources comprising external social network services and being accessible to the user within the software development environment through an integrated browser view configured to enable communication with the one or more entities and management of the plurality of changes to the source code without leaving the software development environment, wherein the additional information associated to the one or more entities is provided from internal information sources comprising at least one of forums and discussion groups that are internal to an enterprise that hosts the distributed development processes.

2. The method of claim 1, wherein processing the change information comprises, for each source code change indicated in the change information, providing concept-level semantics describing the source code change.

3. The method of claim 2, wherein the concept-level semantics are specific to a programming language of the source code.

4. The method of claim 1, wherein providing the sub-set of notifications for display to the user comprises providing an activity feed for display to the user, the activity feed comprising notifications of the sub-set of notifications.

5. The method of claim 1, further comprising providing a set of subscriptions for display to the user, the set of subscriptions comprising entities, to which the user is subscribed.

6. The method of claim 1, wherein providing the sub-set of notifications for display to the user comprises:
    providing source code for display to the user; and
    providing a notification of the sub-set of notifications as an overlay to the source code, the notification being associated with at least a portion of the source code.

7. The method of claim 1, further comprising receiving input from the user, the input indicating a user request to subscribe to an entity, and in response, subscribing the user to the entity.

8. The method of claim 7, wherein subscribing the user to the entity comprises storing subscription information in a subscription repository, the subscription information indicating that the user is subscribed to the entity.

9. The method of claim 1, wherein the sub-set of notifications comprises all notifications that are included in the set of notifications.

10. The method of claim 1, wherein the sub-set of notifications comprises less than all notifications that are included in the set of notifications.

11. The method of claim 1, further comprising filtering notifications from the set of notifications to provide the sub-set of notifications.

12. The method of claim 1, wherein filtering is performed based on one or more filters defined by the user.

13. The method of claim 1, wherein the additional information is associated to a specific entity based on the subscription.

14. A non-transitory computer-readable storage medium coupled to one or more processors and having instructions stored thereon which, when executed by the one or more processors, cause the one or more processors to perform operations for providing notifications in distributed development, the operations comprising:
    receiving, at a server-side computing system, a modified file comprising a plurality of changes to a source code, the changes being entered within a software development environment that is provided by a client-side computing system associated with one of a plurality of entities;
    processing the modified file to identify the plurality of changes to the source code;

automatically generating, a change information, the change information indicating the plurality of changes to the source code;

processing the change information to determine one or more entities associated with the plurality of changes, wherein each entity of the one or more entities comprises one of a developer, a source code file, and a source code artifact;

comparing the one or more entities to one or more subscriptions, the one or more subscriptions being specific to a user;

for each entity associated with a subscription, providing to a corresponding client-side computing system a notification in a set of notifications, the notification comprising an aggregation of two or more committed changes of the plurality of changes that contribute to a single feature of the source code based on a frequency the user wants to be informed of the plurality of changes; and providing a sub-set of notifications for display to the user within the software development environment of the corresponding client-side computing system, the sub-set of notifications comprising an additional information associated to the one or more entities that describes a background and a context of each of the two or more committed changes, the additional information being provided from at least one of internal information sources and external information sources, the external information sources comprising external social network services and being accessible to the user within the software development environment through an integrated browser view configured to enable communication with the one or more entities and management of the plurality of changes to the source code without leaving the software development environment, wherein the additional information associated to the one or more entities is provided from internal information sources comprising at least one of forums and discussion groups that are internal to an enterprise that hosts the distributed development processes.

15. A system, comprising:

a computing device; and a computer-readable storage device coupled to the computing device and having instructions stored thereon which, when executed by the computing device, cause the computing device to perform operations for providing notifications in distributed development, the operations comprising:

receiving, at a server-side computing system, a modified file comprising a plurality of changes to a source code, the changes being entered within a software development environment that is provided by a client-side computing system associated with one of a plurality of entities;

processing the modified file to identify the plurality of changes to the source code;

automatically generating a change information, the change information indicating the plurality of changes to the source code;

processing the change information to determine one or more entities associated with the plurality of changes, wherein each entity of the one or more entities comprises one of a developer, a source code file, and a source code artifact;

comparing the one or more entities to one or more subscriptions, the one or more subscriptions being specific to a user;

for each entity associated with a subscription, providing to a corresponding client-side computing system a notification in a set of notifications, the notification comprising an aggregation of two or more committed changes of the plurality of changes that contribute to a single feature of the source code based on a frequency the user wants to be informed of the plurality of changes; and providing a sub-set of notifications for display to the user within the software development environment of the corresponding client-side computing system, the sub-set of notifications comprising an additional information associated to the one or more entities that describes a background and a context of each of the two or more committed changes, the additional information being provided from at least one of internal information sources and external information sources, the external information sources comprising external social network services and being accessible to the user within the software development environment through an integrated browser view configured to enable communication with the one or more entities and management of the plurality of changes to the source code without leaving the software development environment, wherein the additional information associated to the one or more entities is provided from internal information sources comprising at least one of forums and discussion groups that are internal to an enterprise that hosts the distributed development processes.

* * * * *